(12) United States Patent
Kassner et al.

(10) Patent No.: US 11,273,844 B2
(45) Date of Patent: Mar. 15, 2022

(54) DEVICE, TRANSPORTATION VEHICLE, AND METHOD FOR ASSISTING A USER OF A TRANSPORTATION VEHICLE

(71) Applicant: VOLKSWAGEN AKTIENGESELLSCHAFT, Wolfsburg (DE)

(72) Inventors: Astrid Kassner, Berlin (DE); Joel Rozada, Gothenburg (SE); Fredrik Andresen, Källered (SE)

(73) Assignee: Volkswagen Aktiengesellschaft

( * ) Notice: Subject to any disclaimer, the term of this patent is extended or adjusted under 35 U.S.C. 154(b) by 0 days.

(21) Appl. No.: 16/465,888

(22) PCT Filed: Nov. 22, 2017

(86) PCT No.: PCT/EP2017/080128
§ 371 (c)(1),
(2) Date: May 31, 2019

(87) PCT Pub. No.: WO2018/104061
PCT Pub. Date: Jun. 14, 2018

(65) Prior Publication Data
US 2019/0294427 A1 Sep. 26, 2019

(30) Foreign Application Priority Data
Dec. 7, 2016 (DE) .................... 10 2016 224 411.6

(51) Int. Cl.
*B60W 50/10* (2012.01)
*G06F 16/2457* (2019.01)
(Continued)

(52) U.S. Cl.
CPC ............ *B60W 50/10* (2013.01); *B60K 35/00* (2013.01); *B60W 50/00* (2013.01); *B60W 50/14* (2013.01);
(Continued)

(58) Field of Classification Search
CPC ..................... B60W 50/10; G06F 16/24575
See application file for complete search history.

(56) References Cited

U.S. PATENT DOCUMENTS

| 9,858,832 B1 * | 1/2018 | Hsu-Hoffman | ......... G09B 19/14 |
| 2006/0129289 A1 * | 6/2006 | Kumar | ............... B60L 15/2045 |
| | | | 105/26.05 |

(Continued)

FOREIGN PATENT DOCUMENTS

| DE | 102015207592 A1 | 10/2015 |
| DE | 102016102509 A1 | 8/2016 |

(Continued)

OTHER PUBLICATIONS

Search Report for International Patent Application No. PCT/EP2017/080128; dated Feb. 15, 2018.

(Continued)

*Primary Examiner* — Lewis A Bullock, Jr.
*Assistant Examiner* — Theodore E Hebert
(74) *Attorney, Agent, or Firm* — Barnes & Thornburg LLP (57) ABSTRACT

A device, a transportation vehicle, and a method for assisting a user of a transportation vehicle. The method includes analyzing behavior of the user in the operation of the transportation vehicle and/or constraints of a driving task and, in accordance with a result of the analysis, automatically producing suggestions for software packages to be downloaded.

22 Claims, 4 Drawing Sheets

(51) Int. Cl.
    *B60W 50/00*     (2006.01)
    *B60W 50/14*     (2020.01)
    *G06F 8/61*     (2018.01)
    *H04L 29/08*     (2006.01)
    *B60K 35/00*     (2006.01)
    *G06Q 30/02*     (2012.01)
    *G09B 19/16*     (2006.01)
    *G09B 5/02*     (2006.01)
    *H04L 67/00*     (2022.01)
    *H04L 67/50*     (2022.01)

(52) U.S. Cl.
    CPC .......... *G06F 8/61* (2013.01); *G06F 16/24575* (2019.01); *G06Q 30/0265* (2013.01); *G09B 5/02* (2013.01); *G09B 19/167* (2013.01); *H04L 67/22* (2013.01); *H04L 67/34* (2013.01); *B60K 2370/152* (2019.05); *B60K 2370/1868* (2019.05); *B60K 2370/592* (2019.05); *B60W 2050/0075* (2013.01); *B60W 2050/0083* (2013.01); *B60W 2540/00* (2013.01); *B60W 2555/20* (2020.02); *B60W 2556/10* (2020.02); *B60W 2556/45* (2020.02); *B60W 2556/50* (2020.02)

(56) References Cited

U.S. PATENT DOCUMENTS

| | | | |
|---|---|---|---|
| 2014/0052683 A1* | 2/2014 | Kirkham | G06Q 30/0631 706/46 |
| 2014/0109080 A1* | 4/2014 | Ricci | G06F 8/61 717/174 |
| 2014/0129080 A1* | 5/2014 | Leibowitz | B60R 16/023 701/33.3 |
| 2016/0104328 A1* | 4/2016 | Chen | G07C 5/0858 701/31.5 |
| 2016/0162270 A1* | 6/2016 | Kumar | G06F 8/61 717/177 |
| 2018/0093623 A1* | 4/2018 | Terwilliger | G08G 1/052 |
| 2018/0109920 A1* | 4/2018 | Aggarwal | G06F 16/9535 |
| 2019/0294427 A1* | 9/2019 | Kassner | B60W 50/00 |

FOREIGN PATENT DOCUMENTS

| | | |
|---|---|---|
| JP | 2012021933 A | 2/2012 |
| JP | 2014218124 A | 11/2014 |
| KR | 20140000032 A | 1/2014 |

OTHER PUBLICATIONS

Office Action for Korean Patent Application No. 10-2019-7018543; dated Nov. 30, 2020.

\* cited by examiner

DEVICE, TRANSPORTATION VEHICLE, AND METHOD FOR ASSISTING A USER OF A TRANSPORTATION VEHICLE

PRIORITY CLAIM

This patent application is a U.S. National Phase of International Patent Application No. PCT/EP2017/080128, filed 22 Nov. 2017, which claims priority to German Patent Application No. 10 2016 224 411.6, filed 7 Dec. 2016, the disclosures of which are incorporated herein by reference in their entireties.

SUMMARY

Illustrative embodiments relate to a device, to a transportation vehicle, and to a method for assisting a user of a transportation vehicle. Illustrative embodiments provide an improved way of attracting users to ranges of function packages suitable for them.

BRIEF DESCRIPTION OF THE DRAWINGS

Exemplary embodiments are illustrated in the attached drawings, in which.

DETAILED DESCRIPTION

Classic infotainment systems usually offer the driver pre-defined functionalities, such as a media player, navigation, radio and telephone support. In more modern systems, data connections can be used to integrate additional online information sources, such as news, price information on service stations (fuel prices) and a navigation destination search using an online search provider such as GOOGLE®. In addition, using APPLE® CarPlay or GOOGLE®'s Android Auto, the familiar environment of a mobile phone can be emulated on the central information display in the transportation vehicle.

Disclosed embodiments allow improvements in the assistance provided by a transportation vehicle, which may not be recognized as such by the user.

This is achieved by a method for assisting a user of a transportation vehicle. The transportation vehicle can be, for example, a passenger car, mini-van, lorry, motorcycle, air- and/or water-borne vehicle. The user can be a driver, passenger or front passenger of the transport vehicle. Firstly, a behavior of the user when operating the transportation vehicle is analyzed. The operation of the transportation vehicle can relate to functions of the HMI (human-machine interface) of the transportation vehicle, for example, for communication, information and entertainment packages. The operation may, however, also relate to the transportation vehicle guidance. In general, all functions of the transportation vehicle can be operated by the user, which in principle can be improved by software packages, designed more conveniently or made safer. Alternatively or in addition, constraints of a driving task can be analyzed. This may relate, for example, to weather conditions, lighting conditions, vehicle configurations (trailer towing, off-road/racetrack usage etc.). These constraints can be determined and detected, for example, using sensors and/or by satellite-based methods and on the basis of a position determination using information technology techniques. Depending on a result of the above analysis a suggestion is automatically generated for software packages to be downloaded (by the user into the transportation vehicle). For example, the software package can be automatically downloaded directly and immediately. Alternatively or additionally, the user can be asked whether he/she wishes to install the software package or first receive additional information about the software package and the conditions for its use. The software package may relate, for example, to a driver assistance and/or an entertainment/communication system. Alternatively or in addition, the software packages suggested may relate to navigation functions. The overall result is that the user receives context-sensitive suggestions for additional available software packages. This improves the user experience, user convenience and safety with regard to the control of the transportation vehicle.

The operation of the transportation vehicle may relate, for example, to a longitudinal and/or transverse guidance of the transportation vehicle. For example, a hardware device present in the transportation vehicle (for example, radar sensor, laser, ultrasonic, optical camera, etc.) can be used by the software packages as an alternative or addition. Additional information can be generated and/or evaluated and thus contribute to the convenient and safe control of the transportation vehicle. To detect whether the user can use an appropriate software package, the control of the transportation vehicle can be analyzed by the user as the behavior of the user. For this purpose, an optical camera can take appropriate pictures of the operator/user and submit them for image analysis. Certain movement patterns, modes of behavior or operations can be detected and analyzed in accordance with the disclosure. Also, the information directly generated by the operation of the transportation vehicle (steering movements, brake activation, gas pedal position, etc.) can be automatically analyzed and used to determine suitable suggestions for the transportation vehicle guidance. In addition, the position of the transportation vehicle (for example, GPS) can be used to determine appropriate suggestions. The operation of the transportation vehicle by the user to determine a suitable software package can, however, also be based on the use of a navigation system, a communication function (chat, email, SMS, voice control, telephony, etc.). Alternatively or additionally, the operation can relate to entertainment functions (music/video playback) and alternatively or additionally, to multimedia functions. Appropriate operations can be obtained simply and extensively, since the user interface is usually realized in software. Therefore, the operations can be used to generate the suggestions.

The analysis of the behavior can comprise, for example, an evaluation of a number of repeated control operations, which correspond to each other and/or are even identical. For example, it may be determined only in response to reaching a predefined number of repetitions of particular operator actions that the user will actually benefit from the software package identified in principle as suitable for the purpose. Downloading of software packages which are either unnecessary or only very sporadically used can also be avoided, along with the associated costs.

The software packages can comprise, for example, applications for a navigation system, a communication function, an entertainment function or a multimedia function. Accordingly, the software packages can also relate to driver assistance systems or basic transportation vehicle functions (bodywork, exterior, interior, lighting, voice input/output, etc.). This enables a comprehensive and demand-oriented adaptation of the functions available in the transportation vehicle.

Optionally, in response to the generation of a suggestion or acceptance of a suggestion for software packages to be downloaded, a request can be generated which is used to query the acceptance by the user of the terms and conditions which are associated with the software package. In other words, in spite of the suggestion automatically generated in accordance with the disclosure, the user can be made to agree to the terms and conditions before the downloading and/or approval of execution of the software packages/ function packages is/are carried out. This allows any concerns of the user with regard to data protection and unexpectedly incurred download/data transport costs to be allayed. In addition, it is possible to avoid the possibility of distracting the user from the traffic situation due to an installation process or unannounced functionality available in the transportation vehicle, and thereby negatively affecting traffic safety.

For other software packages on the other hand, an automatic installation be provided, so that the user does not discover a set of functions that was not configured or purchased without prior notice or prior acceptance and can use them without delay. This allows an inhibition threshold on the part of the user with regard to new installations and possible associated costs to be bypassed. In other words, the user is immediately presented with the new functions and can immediately experience their benefits. Optionally, a message can be issued to the user either immediately before or even during or after the use of the automatically installed software packages, by which the conditions of use of the functions are displayed. If the user still does not agree to the usage, the software package can be uninstalled. If the user now agrees to the usage, the functions can be temporarily or permanently installed in the transportation vehicle. Alternatively or additionally, the user can be shown a message about measures for the permanent usage of the function package. For example, the payment of a periodic or one-off sum of money, the acceptance of general terms and conditions, the impossibility of simultaneous use with (for example, previously installed) software packages can be given as preconditions.

As examples of constraints which apply during the performance of the driving task, weather conditions, which were obtained by sensors and/or via wireless data connection to the environment of the transportation vehicle, can be taken into account in producing the suggestion. In addition, lighting conditions and/or journey durations can be used to decide how the user will obtain the best possible added value from a software package to be proposed. The same applies to routes to be traveled by the transportation vehicle either currently or in the future (e.g., the freeway is suitable for the use of longitudinal and/or transverse driving assistance). Other examples are discussed below.

According to a second disclosed embodiment, a device for assisting a user of a transportation vehicle is proposed. It comprises an input unit, which can have, for example, controls and/or a touchscreen (transportation vehicle guidance controls, or similar). In addition, an evaluation unit is provided, which can comprise, for example, a microprocessor, a programmable processor, an electronic control unit, or similar. In addition, an output unit is provided which can comprise a bus node, a display screen and/or a wireless interface to a wireless communication terminal carried by the user. The evaluation unit is configured to analyze, using the input unit, a behavior of the user when operating the transportation vehicle. Alternatively or in addition, constraints of a driving task which is currently being or due to be performed can be analyzed. Depending on the results of the analysis, a suggestion can be automatically made by the output device for software packages to be downloaded (by the user) for the transportation vehicle. As described above, the download can also be carried out automatically. In other words, the suggestion can be accepted automatically by the transportation vehicle (e.g., if predefined constraints exist). An example of a predefined constraint can be an available storage space, a particular driving situation, a minimum fill level of an energy store, or similar. The disclosed device is thus configured to realize the features, feature combinations and the benefits of the disclosed method resulting from them, sufficiently obviously in a corresponding way that, to avoid repetitions, reference is made to the above comments.

According to a third disclosed embodiment, a transportation vehicle is proposed (for example, a passenger car, mini-van, lorry, motorcycle, air- and/or water-borne vehicle). The transportation vehicle has a device according to the second disclosed embodiment. The features, combinations of features and benefits are also obtained for the transportation vehicle in the corresponding way.

In the following, exemplary embodiments are discussed without limiting effect on the scope of the attached claims. In at least one disclosed embodiment, the disclosure can be realized in an infotainment system which can be adaptively and dynamically expanded and offers the user access to new features and services. For this purpose, functions for the transportation vehicle are held in reserve, which are suggested to the user depending on the situation. These functions can be already completely or partially present in the transportation vehicle (e.g., a hardware device (e.g., sensors) required for the functionality) or the user can load these functions into the transportation vehicle via a network connection. It is also possible that the user receives a suggestion, which first requires the installation of a hardware device (and then, possibly, a piece of software). The hardware can be acquired, for example, from a transportation vehicle dealer (or a specialist workshop) and installed in the transportation vehicle there. If a radar distance sensor is already installed in the transportation vehicle at the factory, for example, but not yet enabled for use, the radar sensor can be used for distance control by the user (e.g., in conjunction with an installed camera) for extending the visibility, if a software package is downloaded and installed in accordance with the disclosure. In this context it should be noted that a download does not require a wireless communication link, but can also be carried out via a cable-based link. For example, in a situation in which the driver enters a destination in the navigation system or a likely destination is determined by a predictive navigation system, the navigation system can suggest to the user to acquire additional functionality for the transportation vehicle. This suggestion can be output when the route suggested by the navigation system allows the user to be convinced of the benefits of the functionality (for example, due to the duration of the journey or bad weather conditions). In the infotainment display a specific display area can be reserved for this suggestion. For example, this can be an area in which the time, the temperature or the weather is otherwise displayed. The other types of information which the user can set at particular points remain unchanged. In addition, it can be checked whether a suitable traffic situation prevails, in which the automatic offer of the suggestion does not unreasonably distract the driver. For example, this can be carried out before starting the journey, when stationary, when stopped at a traffic light system, in a traffic jam etc. The suggestion to use the corresponding functionality can also be made as an incentive of a provider. For example, a specialist workshop can reward the user with the use of an additional functional package (for a predefined period of time, at a reduced purchase price, etc.) for booking the next scheduled inspection early. Alternatively, the user can be offered a suggestion to have a radar sensor installed in the transportation vehicle and in connection herewith, to be able to use the distance control free of charge for a predefined period of time. The user can also select a function via a download portal and acquire, hire or pay for a possible functionality based on usage/duration, depending on how the predefined price model is defined.

The suggestion to use additional software packages/functionalities in the transportation vehicle can be carried out dynamically, e.g., depending on the environmental/situational conditions, or the transportation vehicle user and their preferences/requirements/physical condition (e.g., determined by sensors), the location (e.g., determined by satellite) or the transportation vehicle condition. For example, situational conditions can be understood as meaning weather conditions, which change during a journey. For example, the occurrence of heavy fog can lead to the driver being offered an extended warning functionality/object recognition in fog as a software package. With regard to the transportation vehicle user/device user him/herself, the suggestion of extended transportation vehicle functionality can also be made as a function of other profile data of the user. For example, a user may drive along many short routes that are mainly in urban areas. If an appointment calendar entry shows that the user will be driving a longer distance the next day and the driver is known from other usage scenarios to be comfort-oriented, then the use of transportation vehicle functions which are suitable for this route or the road type may already be offered to the user in advance.

For example, the entertainment system (optionally in conjunction with a wireless communication terminal carried by the user) can notify the user of a pending appointment and peculiarities typical of the route (bottlenecks, construction sites, difficult lighting conditions, etc.) and optionally present an offer for a route-dependent, time-dependent or unlimited usage. Another possibility is to make driver condition-dependent suggestions (e.g., testing an autonomous driving mode if the driver is tired, or a sensor-based fatigue detection). Suggestions based on a current place of residence, for example, can be used to identify action options for the user. For example, when the destination known by the navigation system is reached, suggestions can be made for a car park with navigation information to reach it. During lunch times, for example, suggestions can be issued for restaurants along the route, which correspond to the driver's tastes. For example, a suggestion for an app of a restaurant chain or another service provider can be offered. If scheduled maintenance intervals have elapsed, the transportation vehicle can, for example, make appointments with the specialist workshop or suggest that a service appointment is carried out during an extended parking period. If the transportation vehicle is very dirty (identified, for example, based on weather conditions, the distance traveled, the limited function of environmental sensors) suggestions could be made for scheduling cleaning appointments (car wash visits, interior cleaning, etc.).

Figure 1:
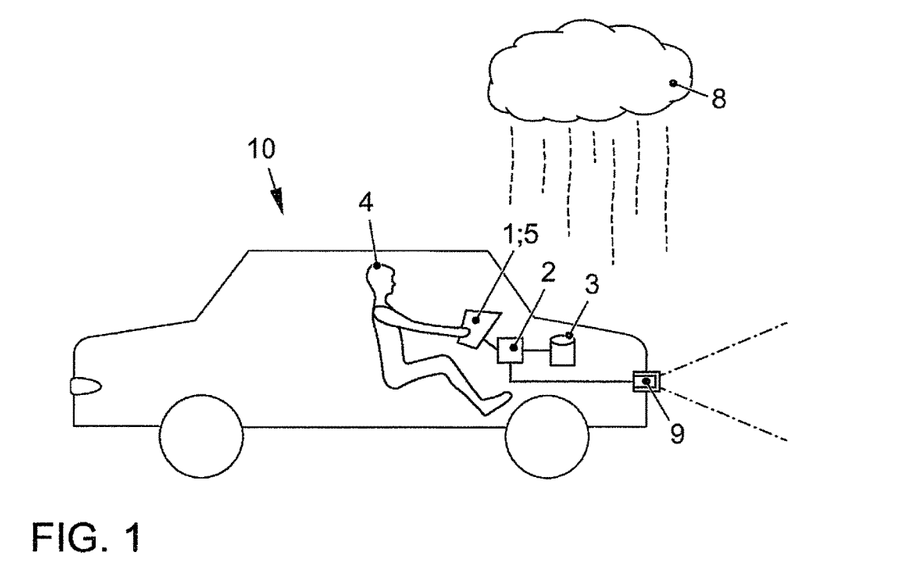
FIG. 1 shows a schematic representation of an exemplary embodiment of a disclosed transportation vehicle with an exemplary embodiment of a disclosed device.

FIG. 1 shows a car 10 as the transportation vehicle, which is equipped with a touchscreen with a touch-sensitive surface 1 and a display screen 5. The touchscreen is connected by information technology to an electronic control unit 2 as an evaluation unit. A data store 3 holds instructions for executing a disclosed method, and storage space for additional software packages to be installed. By this, the electronic control unit 2, for example, can use a radar sensor 9 already installed at an earlier date (e.g., at the factory) to an extent not yet provided for. An automatically generated suggestion can be made to the user 4, for example, in response to detecting a forthcoming drive in the rain (see rain cloud 8). For example, the user 4 can receive an automatic suggestion to download and use software packages for the (improved) use of the radar sensor 9 in a trial mode.

Figure 2:
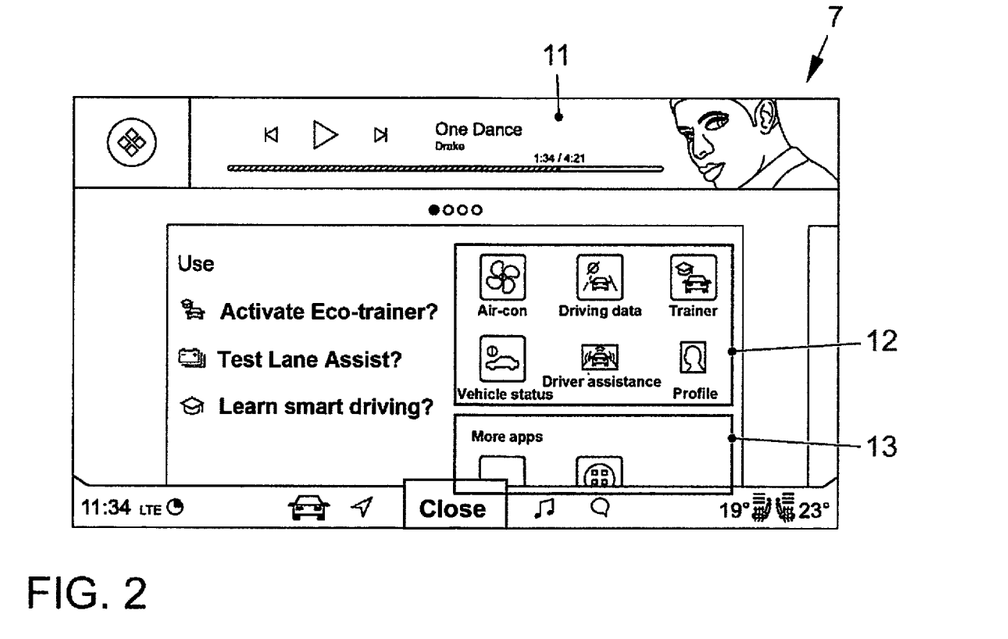
FIG. 2 shows a screen shot of an exemplary embodiment of a disclosed device.

FIG. 2 shows an example screen shot 7 of an exemplary embodiment of a disclosed device. In this figure, in a header bar 11 a plurality of buttons is shown for controlling the multimedia playback. An application field 12 has icons which give access to different apps, which are either defined at the factory or have already been installed subsequently by the driver. Underneath this a field 13 is provided for the arrangement of additional applications ("apps"). For example, suggestions automatically made in accordance with the disclosure are displayed there, which can be downloaded by touching them.

Figure 3:
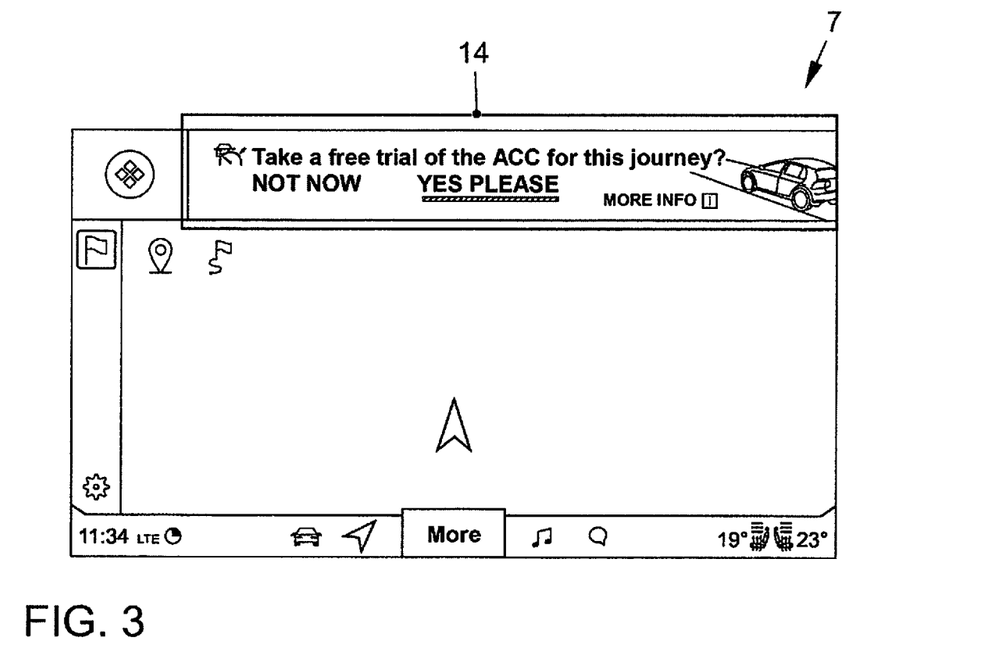
FIG. 3 shows a second screen shot of an exemplary embodiment of a disclosed device.

FIG. 3 shows a screen shot 7 for the case when a disclosed device has identified a certain added value for the user by using a dynamic distance control system (Adaptive Cruise Control, ACC). In response, the header bar 11 (see FIG. 2) is covered by a text field 14, by which the driver is asked whether he/she wishes to take a free trial of the ACC function. The driver has the choice between "Yes, please" and "Not now".

Figure 4:
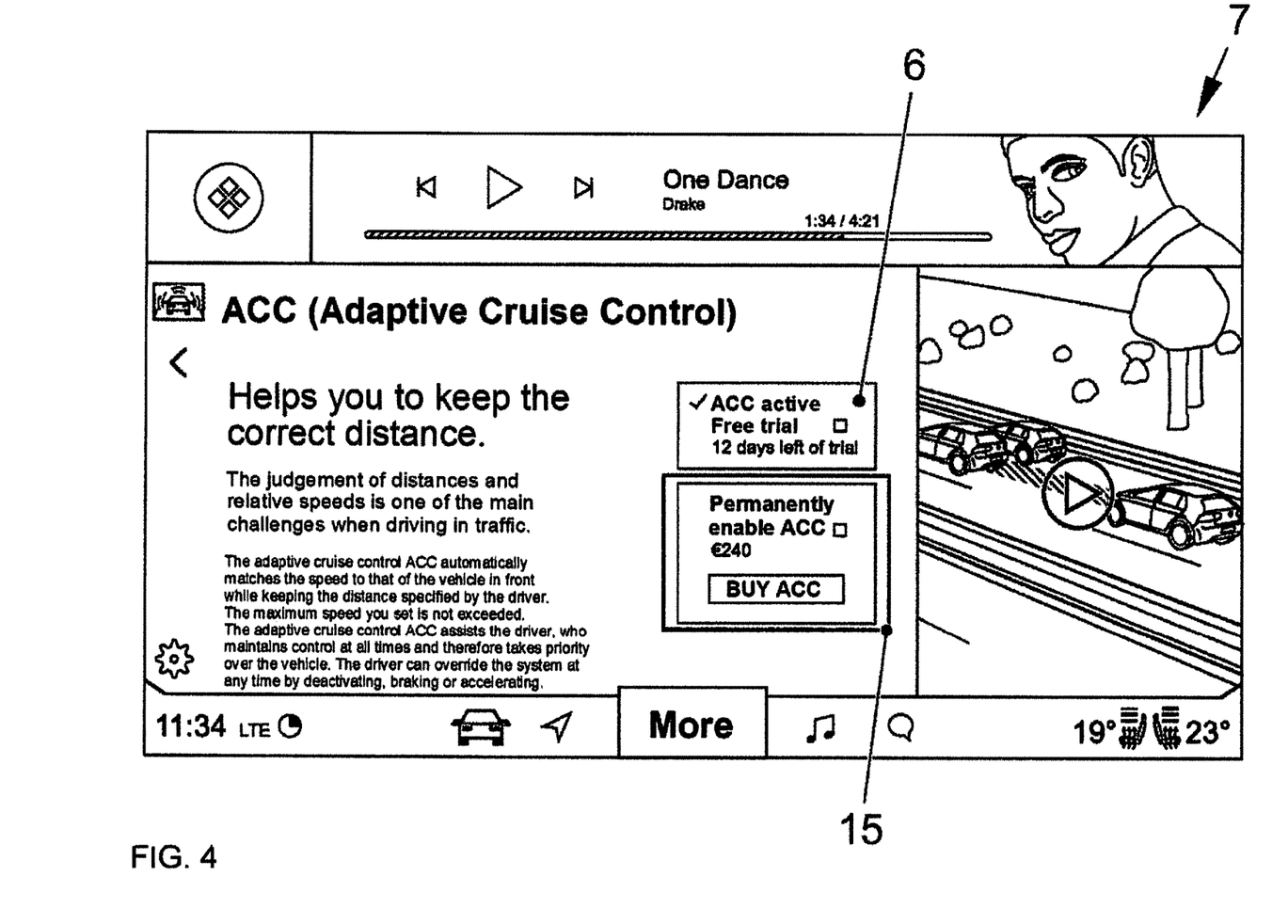
FIG. 4 shows a third screen shot of an exemplary embodiment of a disclosed device.

FIG. 4 shows a screen display 7, which is displayed in response to the acceptance ("Yes, please") of the free trial period of the ACC function. A message 6 shows the time remaining for the ACC free trial. A message 15 summarizes actions required (payment of 240.00 Euro) for permanent use of the ACC function package and provides a button for the user's consent declaration.

Figure 5:
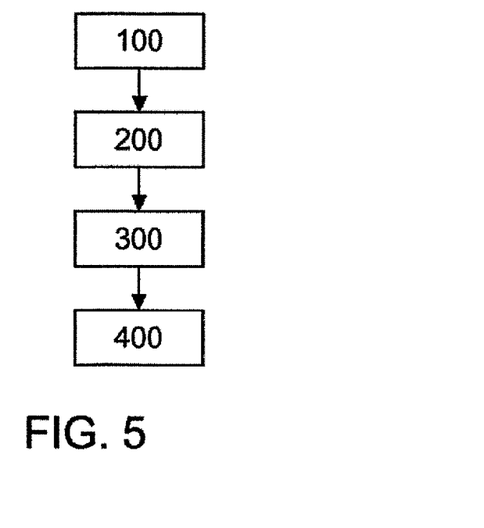
FIG. 5 shows a flow chart illustrating operations of an exemplary embodiment of a disclosed method for assisting a user of a transportation vehicle.

FIG. 5 shows a flow chart illustrating operations of an exemplary embodiment of a disclosed method for assisting a user of a transportation vehicle. In operation at 100, a behavior of the user when operating the transportation vehicle is automatically analyzed, along with constraints of a driving task of the transportation vehicle. This is carried out without the user initiating the analysis of the behavior or of the constraints. In operation at 200, depending on the outcome of the analysis, automatic suggestions for software packages to be downloaded are generated for the transportation vehicle. For example, the suggestions can be output on a CID (central information display). In operation at 300, an acceptance by the user is requested with predefined conditions for use of the software packages. This can be carried out, for example, by a pop-up. In response to the user's acceptance (confirmation of the pop-up), in operation at 400 the software packages are automatically downloaded and the additional function packages are enabled.

LIST OF REFERENCE NUMERALS 1 touch-sensitive surface
2 electronic control unit 3 data store
4 user
5 display screen
6 message
7 screen shot
8 rain cloud
9 radar sensor
10 passenger car
11 header bar
12 application field
13 field
14 text field
15 message
100 to 400 method operations

The invention claimed is:

1. A method for assisting a user of a transportation vehicle, the method comprising:
  detecting a behavior of the user when operating the transportation vehicle via at least one device included in the transportation vehicle or external to the transportation vehicle and connected to the transportation vehicle via a network connection, the at least one device including (i) a human-machine interface configured to detect at least one interaction of the user with the human-machine interface, and (ii) a hardware device including at least one of a sensor, a laser, an ultrasonic, or an optical camera configured to detect control of the transportation vehicle or guidance of the transportation of the vehicle, the guidance including longitudinal and/or transverse guidance of the transportation vehicle, and detecting constraints of a driving task via the at least one device included in the transportation vehicle or external to the transportation vehicle and connected to the transportation vehicle via a network connection, the at least one device including at least one of sensors, radar, satellite devices, and optical cameras;
  analyzing the behavior of the user when operating the transportation vehicle and analyzing constraints of the driving task, the driving task including operating the transportation vehicle on an upcoming route to be traveled;
  automatically generating and outputting, via a user interface of the transportation vehicle, suggestions for at least one software package to be downloaded based on (i) present physical or functional vehicle configurations based on the upcoming route to be traveled or (ii) future physical or functional vehicle configurations based on the upcoming route to be traveled, wherein the automatic generating and outputting is executed in response to the analysis of the behavior of the user and the constraints of the driving task,
  determining a plurality of lengths of routes on which the user has historically and repeatedly operated the transportation vehicle;
  generating profile data based the plurality of lengths of routes;
  determining an average route length of the plurality of lengths of routes and including the average route length in the generated profile data;
  in response to the length from start to finish of the upcoming route to be traveled being greater than or less than the average route length, suggesting at least one software package corresponding to a route type and a road type of the upcoming route; and
  automatically downloading the suggested at least one software package and automatically installing a package of functions associated with the at least one suggested software package,
  wherein the analysis of the behavior includes evaluation of a plurality of repetitions of a particular operator action, and
  wherein the length from start to finish of the upcoming route to be traveled is determined based on an appointment calendar entry stored in the user interface of the transportation vehicle.

2. The method of claim 1, wherein the operation of the transportation vehicle relates to:
  a guidance of the transportation vehicle; and/or
  a use of a navigation system; and/or
  a communication function; and/or
  an entertainment function; and/or
  a multi-media function.

3. The method of claim 1, wherein the at least one software package comprises applications for:
  a driver assistance system; and/or
  a navigation system; and/or
  a communication function; and/or
  an entertainment function; and/or
  a multi-media function.

4. The method of claim 1, further comprising:
  requesting acceptance by a user of predefined conditions for use of the at least one software package; and
  executing a download and/or enabling an execution of the at least one software package in response to an acceptance by the user.

5. The method of claim 1, further comprising:
  outputting a message about conditions for use of the package of functions and/or measures for long-term use of the function package,
  wherein the automatically installing of the package of functions only includes functions not configured by the user.

6. The method of claim 1, wherein the constraints of the driving task further comprise:
  weather conditions; and/or
  lighting conditions; and/or
  journey durations.

7. The method of claim 1, wherein the suggestions for at least one software package to be downloaded are further based on a length from start to finish of an upcoming route to be traveled.

8. The method of claim 1, wherein, in response to a determination that the average route length is substantially less than the average route length and the length from start to finish of the upcoming route to be traveled is substantially greater than the average route length, the suggestion of the at least one software package includes suggesting at least one software package corresponding to long route types and long road types.

9. The method of claim 8, further comprising:
  notifying the user of at least one characteristic of the long route types and long road types of the upcoming route to be traveled, the at least one characteristic including at least one of a bottleneck in the road, construction sites on the road, and difficult lighting conditions of the road.

10. The method of claim 1, further comprising:
  determining, via at least one of the least one of sensors, radar, satellite devices, and optical cameras, whether the transportation vehicle is at least one of stationary, stopped at a traffic light, and in heavy traffic, wherein the automatically generating and outputting of the suggestions for at least one software package in response to the transportation vehicle being at least one of stationary, stopped at a traffic light, and in heavy traffic.

11. A device for assisting a user of a transportation vehicle, the device comprising:
an input unit configured to detect a behavior of the user when operating the transportation vehicle via at least one device included in the transportation vehicle or external to the transportation vehicle and connected to the transportation vehicle via a network connection, the at least one device including (i) a human-machine interface configured to detect at least one interaction of the user with the human-machine interface, and (ii) a hardware device including at least one of a sensor, a laser, an ultrasonic, or an optical camera configured to detect control of the transportation vehicle or guidance of the transportation of the vehicle, the guidance including longitudinal and/or transverse guidance of the transportation vehicle, and detect constraints of a driving task via the at least one device included in the transportation vehicle or external to the transportation vehicle and connected to the transportation vehicle via a network connection, the at least one device including at least one of sensors, radar, satellite devices, and optical cameras;
an evaluation unit; and
an output unit,
wherein the evaluation unit is configured to, by the input unit to analyze the behavior of the user when operating the transportation vehicle and the constraints of the driving task, the constraints of the driving task including operating the transportation vehicle on an upcoming route to be traveled,
wherein the output unit automatically generates and outputs suggestions for at least one software package to be downloaded for the transportation vehicle based on (i) present physical or functional vehicle configurations based on the upcoming route to be traveled or (ii) future physical or functional vehicle configurations based on the upcoming route to be traveled in response to the analysis of the behavior of the user and the constraints of the driving task,
wherein the analysis of the behavior includes evaluation of a plurality of repetitions of a particular operator action,
wherein the evaluation unit is further configured to determine a plurality of lengths of routes on which the user has historically and repeatedly operated the transportation vehicle, generate profile data based the plurality of lengths of routes, determine an average route length of the plurality of lengths of routes and including the average route length in the generated profile data, and, in response to the length from start to finish of the upcoming route to be traveled being greater than or less than the average route length, suggesting at least one software package corresponding to a route type and a road type of the of the upcoming route,
wherein the suggested at least one software package is automatically downloaded and a package of functions associated with the at least one suggested software package is automatically installed, and
wherein the length from start to finish of the upcoming route to be traveled is determined based on an appointment calendar entry stored in the user interface of the transportation vehicle.

12. The device of claim 11, wherein the operation of the transportation vehicle relates to:
a guidance of the transportation vehicle; and/or
a use of a navigation system; and/or
a communication function; and/or
an entertainment function; and/or
a multi-media function.

13. The device of claim 11, wherein the at least one software package comprises applications for:
a driver assistance system; and/or
a navigation system; and/or
a communication function; and/or
an entertainment function; and/or
a multi-media function.

14. The device of claim 11, further comprising:
requesting acceptance by a user of predefined conditions for use of the at least one software package; and
executing a download and/or enabling an execution of the at least one software package in response to an acceptance by the user.

15. The device of claim 11, further comprising:
outputting a message about conditions for use of the package of functions and/or measures for long-term use of the function package,
wherein the automatically installing of the package of functions only includes functions not configured by the user.

16. The device of claim 11, wherein the constraints of the driving task further comprise:
weather conditions; and/or
lighting conditions; and/or
journey durations.

17. A transportation vehicle comprising a device for assisting a user of a transportation vehicle, the device comprising:
an input unit configured to detect a behavior of the user when operating the transportation vehicle via at least one device included in the transportation vehicle or external to the transportation vehicle and connected to the transportation vehicle via a network connection, the at least one device including (i) a human-machine interface configured to detect at least one interaction of the user with the human-machine interface, and (ii) a hardware device including at least one of a sensor, a laser, an ultrasonic, or an optical camera configured to detect control of the transportation vehicle or guidance of the transportation of the vehicle, the guidance including longitudinal and/or transverse guidance of the transportation vehicle, and detect constraints of a driving task via the at least one device included in the transportation vehicle or external to the transportation vehicle and connected to the transportation vehicle via a network connection, the at least one device including at least one of sensors, radar, satellite devices, and optical cameras;
an evaluation unit; and
an output unit,
wherein the evaluation unit is configured, by the input unit, to analyze the behavior of the user when operating the transportation vehicle and the constraints of the driving task, the constraints of the driving task including operating the transportation vehicle on an upcoming route to be traveled,
wherein the output unit automatically generates and outputs suggestions for at least one software package to be downloaded for the transportation vehicle based on (i) present physical or functional vehicle configurations based on the upcoming route to be traveled or (ii) future physical or functional vehicle configurations based on the upcoming route to be traveled in response to the analysis of the behavior of the user and the constraints of the driving task, wherein the analysis of the behavior includes evaluation of a plurality of repetitions of a particular operator action, wherein the evaluation unit is further configured to determine a plurality of lengths of routes on which the user has historically and repeatedly operated the transportation vehicle, generate profile data based the plurality of lengths of routes, determine an average route length of the plurality of lengths of routes and including the average route length in the generated profile data, and, in response to the length from start to finish of the upcoming route to be traveled being greater than or less than the average route length, suggesting at least one software package corresponding to a route type and a road type of the of the upcoming route, wherein the suggested at least one software package is automatically downloaded and a package of functions associated with the at least one suggested software package is automatically installed, and wherein the length from start to finish of the upcoming route to be traveled is determined based on an appointment calendar entry stored in the user interface of the transportation vehicle.

18. The transportation vehicle of claim 17, wherein the operation of the transportation vehicle relates to:
 a guidance of the transportation vehicle; and/or
 a use of a navigation system; and/or
 a communication function; and/or
 an entertainment function; and/or
 a multi-media function.

19. The transportation vehicle of claim 17, wherein the at least one software package comprises applications for:
 a driver assistance system; and/or
 a navigation system; and/or
 a communication function; and/or
 an entertainment function; and/or
 a multi-media function.

20. The transportation vehicle of claim 17, further comprising:
 requesting acceptance by a user of predefined conditions for use of the at least one software package; and
 executing a download and/or enabling an execution of the at least one software package in response to an acceptance by the user.

21. The transportation vehicle of claim 17, further comprising:
 outputting a message about conditions for use of the package of functions and/or measures for long-term use of the function package,
 wherein the automatically installing of the package of functions only includes functions not configured by the user.

22. The transportation vehicle of claim 17, wherein the constraints of the driving task further comprise:
 weather conditions; and/or
 lighting conditions; and/or
 journey durations.

* * * * *